(12) United States Patent
Bleisteiner et al.

(10) Patent No.: US 7,711,007 B2
(45) Date of Patent: May 4, 2010

(54) METHOD AND APPARATUS FOR SYNCHRONOUS SWITCHING OF OPTICAL TRANSPORT NETWORK SIGNALS

(75) Inventors: Bernd Markus Bleisteiner, Fuerth (DE); Manfred Alois Loeffler, Igensdorf (DE); Gerhard Meyer, Eggolsheim (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 835 days.

(21) Appl. No.: 11/116,510

(22) Filed: Apr. 28, 2005

(65) Prior Publication Data

US 2006/0245450 A1    Nov. 2, 2006

(51) Int. Cl.
 *H04J 1/00* (2006.01)
(52) U.S. Cl. .................................... 370/490; 370/503
(58) Field of Classification Search ............... 370/389, 370/358, 366, 386, 395.51, 395.64, 465, 370/471, 473, 474, 476, 487, 490, 494, 503, 370/509
See application file for complete search history.

(56) References Cited

U.S. PATENT DOCUMENTS

| | | | | |
|---|---|---|---|---|
| 5,457,691 A | * | 10/1995 | Romeijn | 370/510 |
| 5,781,597 A | * | 7/1998 | Owen et al. | 375/372 |
| 5,815,490 A | * | 9/1998 | Lu | 370/223 |
| 7,385,968 B2 | * | 6/2008 | Noirie et al. | 370/360 |
| 7,415,207 B2 | * | 8/2008 | Lanzone et al. | 398/46 |
| 2001/0036187 A1 | * | 11/2001 | Lometti et al. | 370/395 |
| 2002/0027905 A1 | * | 3/2002 | Heuer | 370/386 |
| 2003/0016416 A1 | * | 1/2003 | Wolf | 359/139 |
| 2003/0120799 A1 | | 6/2003 | Lahav et al. | |
| 2004/0013137 A1 | * | 1/2004 | Lohr | 370/539 |
| 2004/0105456 A1 | * | 6/2004 | Lanzone et al. | 370/429 |

FOREIGN PATENT DOCUMENTS

EP    1 229 692 A    8/2002

OTHER PUBLICATIONS

"Network Node Interface for the Synchronous Digital Hierarchy (SDH)" Amendment 2, ITU-T Recommendation G.707/Y.1322 (Aug. 2002).

* cited by examiner

*Primary Examiner*—Brenda Pham
(74) *Attorney, Agent, or Firm*—Wall & Tong, LLP

(57) ABSTRACT

The invention includes a method and apparatus for synchronously switching at least one plesiochronous signal within a network element. Specifically, a method according to one embodiment of the invention includes receiving the at least one plesiochronous signal, and mapping the at least one plesiochronous signal into at least one synchronous signal. The at least one synchronous signal includes at least one virtually-concatenated signal, where each of the at least one virtually-concatenated signal includes a plurality of sub-signals, and each of the sub-signals is adapted for being synchronously switched within the network element.

19 Claims, 4 Drawing Sheets

100

300

METHOD AND APPARATUS FOR SYNCHRONOUS SWITCHING OF OPTICAL TRANSPORT NETWORK SIGNALS

FIELD OF THE INVENTION

The invention relates to the field of communication networks and, more specifically, to switching of plesiochronous signals.

BACKGROUND OF THE INVENTION

Using existing standards, such as the International Telecommunications Union-Telecommunications (ITU-T) G.Modem standard (i.e., the ITU-T G.707 standard), an Optical Transport Network (OTN) signal (e.g., an Optical Data Unit (ODUk) signal) may be transported and switched data transparent (i.e., all of the original bits are preserved). In other words, use of virtual concatenation and associated functions enables individual signals of which an OTN signal is composed to traverse a network using different communication paths through the network. Unfortunately, however, the associated jitter and timing cannot be guaranteed for a network-wide signal path.

As OTN signals are transported across a network using the G.modem standard, individual signals associated with the original OTN signal are switched independently and, as such, traverse different paths through the network (e.g., traversing different network elements between the originating network element the terminating network element). As a result, reassembly of the original OTN signal on the terminating node requires delay compensation to account for the different times in which the individual signals traverse the network. Unfortunately, such delay compensation is quite complicated and, therefore, expensive to implement.

As such, a system fully implemented according the G.Modem standard requires significant effort to account for delay compensation (where the effort required increases with an increase in the signal bandwidth). For example, engineering delay compensation (with respect to the required delay of ~32 ms), Random Access Memory (RAM) interfaces, and performance requirements for OC-192/STM-64 signals (i.e., 10 G signal) is particularly difficult. Furthermore, mapping of ODU3 signals is not currently defined by the G.Modem standard since the H4 byte coding used for alignment and delay compensation only supports 256 sub-signals (and 272 sub signals are required). Therefore, the G.modem standard is limited with respect to certain applications.

SUMMARY OF THE INVENTION

Various deficiencies in the prior art are addressed through the invention of a method and apparatus for synchronously switching at least one plesiochronous signal within a network element. Specifically, a method according to one embodiment of the invention comprises receiving the at least one plesiochronous signal and mapping the at least one plesiochronous signal into at least one synchronous signal. The at least one synchronous signal comprises at least one virtually-concatenated signal where each of the at least one virtually-concatenated signal comprises a plurality of sub-signals, and where each of the sub-signals is adapted for being synchronously switched within the network element.

In one embodiment, the virtually-concatenated signals are not virtually-concatenated signals in the narrower sense of the SONET/SDH standard in that the signals do not have immanent information (e.g., specific overhead bytes) which must be evaluated for reassembly. As such, in one embodiment, reassembly of the at least one plesiochronous signal is performed using knowledge of the connection routing. In one embodiment, reassembly of the at least one plesiochronous signal is performed using an assumption that delay compensation is not required.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
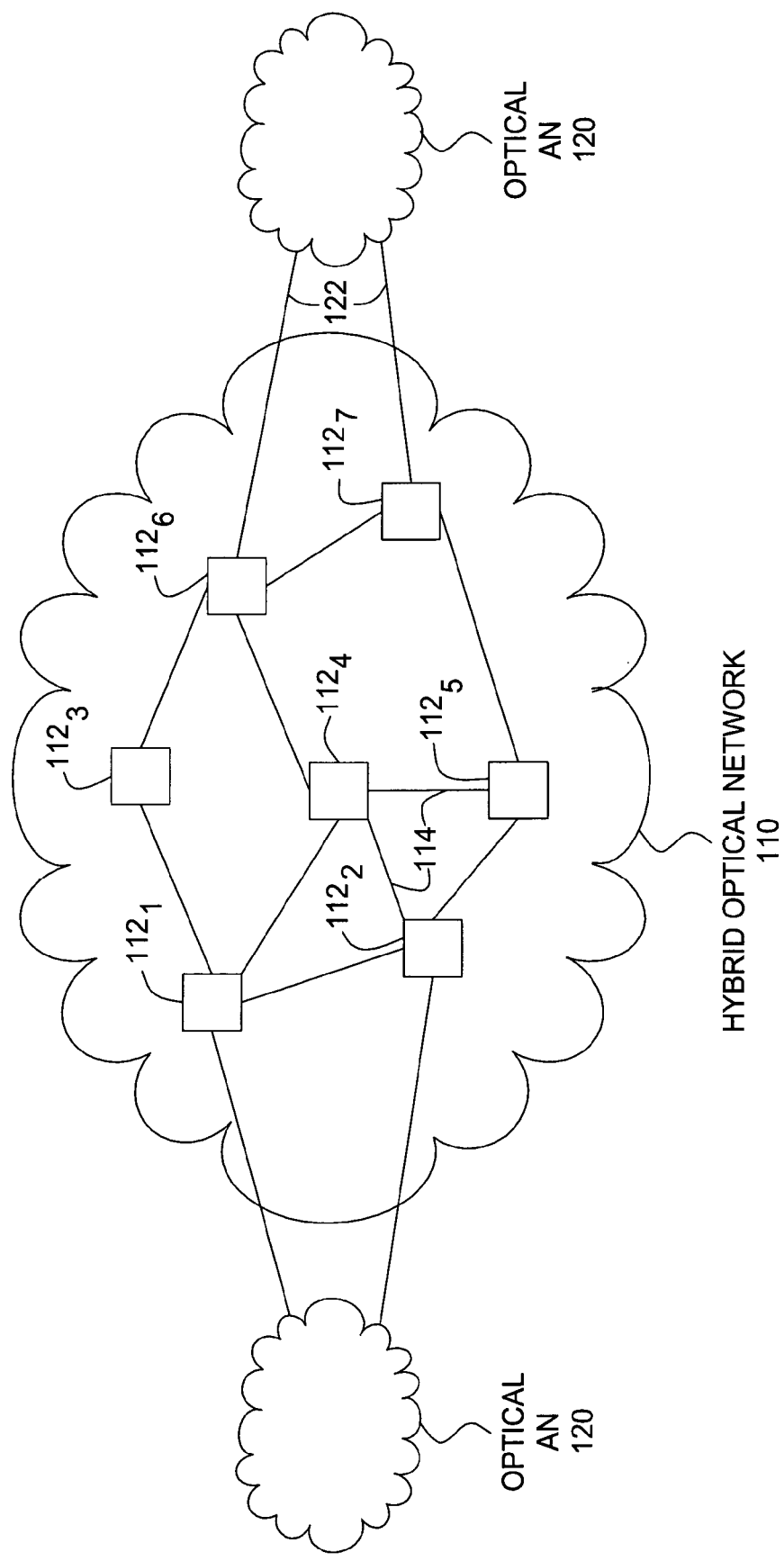
FIG. 1 depicts a high-level block diagram of a communications network architecture.

The present invention is discussed in the context of a communications network architecture comprising a plurality of hybrid optical network elements; however, the present invention can readily be applied to other networks and network topologies. In general, the present invention enables conversion of plesiochronous signals to synchronous signals such that the plesiochronous signals may be switched using a synchronous switching fabric. Similarly, the present invention enables conversion of synchronous signals switched using a synchronous switching fabric to plesiochronous signals for transmission towards other network elements.

In one embodiment, the present invention maps non-SONET/SDH data rate signals into SONET/SDH data rate signals and synchronously switches the SONET/SDH data rate signals using a synchronous switching fabric. In one such embodiment, SONET/SDH data rate signals comprise synchronous virtually-concatenated signals, where the virtual concatenation is implemented locally (i.e., virtual concatenation of the synchronous signals for synchronous switching is transparent to other network elements). In another embodiment, the present invention maps the synchronously switched SONET/SDH data rate signals into non-SONET/SDH data rate signals for transmission towards another network element.

Furthermore, the present invention enables synchronous switching of plesiochronous signals in a manner tending to preserve the signal timing associated with the plesiochronous signals, and obviating the need for delay compensation. As such, the present invention thereby obviates the need for H4 byte synchronization processing. Therefore, by obviating the need for H4 byte synchronization processing, the present invention seamlessly enables support for OC-768/STM-256 signals (i.e., 40 G signals), larger SONET/SDH signals, and like SONET/SDH signals not capable of being supported by the ITU-T G.Modem standard.

In general, current higher-order cross connect systems in traditional Synchronous Optical Network (SONET) and Synchronous Digital Hierarchy (SDH) systems are implemented as Synchronous Transport Signal Level 1 (STS1) and Virtual Container Level 4 (VC4) based switches, respectively. In such systems, following completion of higher-order pointer processing on the associated interface card, the complete payload (i.e., the customer signal to be transported in the STS1/VC4 signal) is fully synchronous. Thus, switching is easily implemented using column switching. In general, devices associated with such processing are timeslot interchangers (TSIs).

In one embodiment, as described herein, the present invention adapts optical transport network (OTN) signals (i.e., ODU1, ODU2, ODU3, and the like) to the time-division multiplexing (TDM) domain (i.e., SONET, SDH, and the like). As such, the present invention enables processing (e.g., cross-connecting, protection switching, and the like) of OTN signals using traditional TDM equipment (i.e., using legacy SONET/SDH equipment). In other words, by enabling conversion between OTN signals and SONET/SDH signals within existing TDM equipment, the present invention thereby enables the switching of OTN signals using less complex systems. As such, implementation of the present invention results in lower system costs as a result of reuse of existing SONET/SDH equipment to switch plesiochronous OTN signals.

FIG. 1 depicts a high-level block diagram of a communications network architecture. Specifically, communications network architecture 100 of FIG. 1 comprises a hybrid optical network (HON) 110 and a plurality of optical access networks (OANs) 120 (collectively, OANs 120). As depicted in FIG. 1, OANs 120 comprise at least one of an OTN network, a SONET network, a SDH network, and like optical networks as known in the art. As such, although not depicted, the OANs 120 comprises various optical network elements and associated communication links.

As depicted in FIG. 1, HON 110 comprises a plurality of hybrid optical network elements (HONEs) $112_1$-$112_7$ (collectively, HONEs 112) in communication using a plurality of communication links (CLs) 114 (collectively, CLs 114). The OANs 120 communicate with at least a portion of the HONEs 112 using a plurality of communication links (CLs) 122 (collectively, CLs 122). As such, the HONEs 112 are operable for receiving OTN signals, SONET/SDH signals, and like optical signals as known in the art. Similarly, the HONEs 112 are operable for transmitting OTN signals, SONET/SDH signals, and like optical signals as known in the art.

In one embodiment, the present invention converts plesiochronous OTN signals into synchronous SONET/SDH signals, processes the synchronous SONET/SDH signals (e.g., cross-connecting, protection switching, and the like), and converts the synchronous SONET/SDH signals into plesiochronous OTN signals. In one embodiment, plesiochronous OTN signals are converted into synchronous virtual container signals (e.g., STS-3, STS-1, and like signals for SONET networks, VC4, VC3, and like signals for SDH networks, and like signals). In one such embodiment, the synchronous virtual container signals are virtually-concatenated.

In one embodiment, in which synchronous switching of plesiochronous signals is performed in a SONET network, plesiochronous OTN signals are converted into synchronous STS1-based virtual container signals. In one embodiment, the STS1 virtual container signals comprise STS1-Yv signals, where Y comprises a number of sub-signals required for performing the conversion. In this embodiment, the synchronous STS1-based signals are then switched in an STS1-based switching fabric. In this embodiment, the switched synchronous STS1-based signals are then converted into plesiochronous OTN signals for transmission towards another network element.

In one embodiment, in which synchronous switching of plesiochronous signals is performed in a SDH network, plesiochronous OTN signals are converted into synchronous VC4-based virtual container signals. In one embodiment, the VC4 virtual container signals comprise VC4-Xv signals, where X comprises a number of sub-signals required for performing the conversion. In this embodiment, the synchronous VC4-based signals are then switched in a VC4-based switching fabric. In this embodiment, the switched synchronous VC4-based signals are then converted into plesiochronous OTN signals for transmission towards another network element.

In one embodiment, the plesiochronous OTN signals comprise optical data unit (ODU) signals. In one embodiment, ODU signals comprise ODU1 signals (i.e., 2.5 G signals), ODU2 signals (i.e., 10 G signals), ODU3 signals (i.e., 40 G signals), and like ODU signals. In this embodiment, ODU signals are denoted as ODUk signals (where k comprises an integer such that $k \geq 1$). In this embodiment, conversion of plesiochronous OTN signals into synchronous STS1/VC4 based signals comprises converting plesiochronous ODUk signals into synchronous STS1-Yv/VC4-Xv signals (where Y=3X), where Y and X comprise respective numbers of sub-signals required for performing such conversions for SONET and SDH, respectively. In one embodiment, the synchronous STS1-Yv/VC4-Xv signals comprise virtually-concatenated synchronous signals.

For example, in a SONET network a plesiochronous ODU1 signal is converted into a synchronous STS1-51v signal, a plesiochronous ODU2 signal is converted into a synchronous STS1-204v signal, and a plesiochronous ODU3 signal is converted into a synchronous STS1-816v signal. Similarly, for example, in a SDH network a plesiochronous ODU1 signal is converted into a synchronous VC4-17v signal, a plesiochronous ODU2 signal is converted into a synchronous VC4-68v signal, and a plesiochronous ODU3 signal is converted into a synchronous VC4-272v signal. As such, in one embodiment, a plesiochronous signal is mapped into a synchronous signal comprising a virtual concatenation of sub-signals.

Similarly, in this embodiment, conversion of synchronous STS1/VC4 based signals into plesiochronous OTN signals comprises converting switched synchronous STS1-Yv/VC4-Xv signals into plesiochronous ODUk signals. For example, a switched STS1-51v signal is converted into an ODU1 signal, a switched STS1-204v signal is converted into an ODU2 signal, and a switched STS1-816v signal is converted into an ODU3 signal. Similarly, for example, a switched VC4-17v signal is converted into an ODU1 signal, a switched VC4-68v signal is converted into an ODU2 signal, and a switched VC4-272v signal is converted into an ODU3 signal. As such, in one embodiment, a synchronous signal comprising a virtual concatenation of sub-signals is demapped into a plesiochronous signal.

Although described herein with respect to ODUk signals for which k=1, 2, and 3, the present invention is extendable for conversion of higher rate signals (e.g., ODUk signals where k>3), thereby enabling cross-connection, protection switching, and like processing of higher rate signals. Furthermore, although described herein with respect to OTN signals, other plesiochronous signals may be converted to synchronous signals using the present invention. Similarly, although described herein with respect to synchronous SONET/SDH virtual container signals (e.g., STS1-51v, STS1-204v, and STS1-816v signals for SONET; VC4-17v, VC4-68v, and VC4-272v signals for SDH), the present invention may utilize various other synchronous signals for synchronously switching plesiochronous signals.

Figure 2:
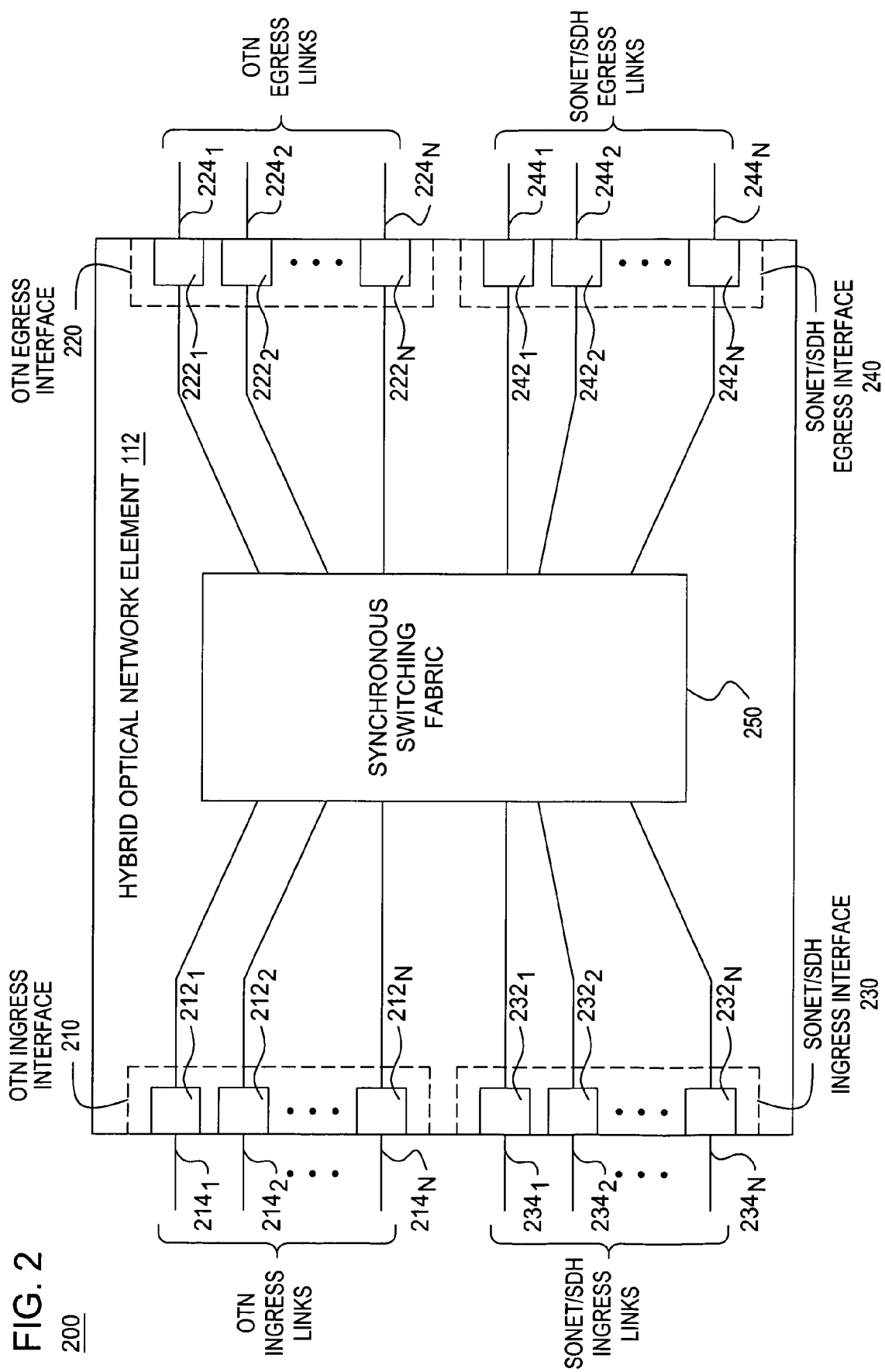
FIG. 2 depicts a high-level block diagram of a hybrid optical network element as depicted in FIG. 1.

FIG. 2 depicts a high-level block diagram of a hybrid optical network element (HONE) as depicted in FIG. 1. Specifically, as depicted in FIG. 2, HONE 112 comprises an OTN ingress interface (OII) 210, an OTN egress interface (OEI) 220, a SONET/SDH ingress interface (SII) 230, a SONET/SDH egress interface (SEI) 240, and a synchronous switching fabric (SSF) 250. As depicted in FIG. 2, OII 210 comprises a plurality of OTN ingress line cards (OILCs) $212_1$-$212_N$ (collectively, OILCs 212), OEI 220 comprises a plurality of OTN egress line cards (OELCs) $222_1$-$222_N$ (collectively, OELCs 222), SII 230 comprises a plurality of SONET/SDH ingress line cards (SILCs) $232_1$-$232_N$ (collectively, SILCs 232), and SEI 240 comprises a plurality of SONET/SDH egress line cards (SELCs) $242_1$-$242_N$ (collectively, SELCs 242).

As depicted in FIG. 2, the OILCs 210 receive OTN-based signals via a respective plurality of OTN ingress links (OILs) $214_1$-$214_N$ (collectively, OILs 214). The OILCs 210 convert the OTN signals to STS1-Yv/VC4-Xv signals and transmit the STS1-Yv/VC4-Xv signals to SSF 250 for synchronous switching (STS1-based for SONET; VC4-based for SDH). The OELCs 220 receive the switched STS1-Yv/VC4-Xv signals from SSF 250. The OELCs 220 convert the STS1-Yv/VC4-Xv signals to OTN signals and transmit the OTN signals via a respective plurality of OTN egress links (OELs) $224_1$-$224_N$ (collectively, OELs 224).

Similarly, as depicted in FIG. 2, SILCs 232 receive SONET/SDH signals via a respective plurality of SONET/SDH ingress links (SILs) $234_1$-$234_N$ (collectively, SILs 234). The SILCs 232 convert the SONET/SDH signals to STS1/VC4 signals and forward the STS1/VC4 signals to SSF 250 for synchronous switching (STS1-based for SONET; VC4-based for SDH). The SELCs 242 receive the switched STS1/VC4 signals from SSF 250. The SELCs 242 convert the STS1/VC4 signals to SONET/SDH signals and transmit the SONET/SDH signals via a respective plurality of SONET/SDH egress links (SELs) $244_1$-$244_N$ (collectively, SELs 244).

As described herein with respect to the OILCs 212 and the OELCs 222, the OTN signals comprise ODUk signals, such as ODU1 signals, ODU2 signals, ODU3 signals, and like ODUk signals as known in the art. Similarly, as described herein with respect to SILCs 232 and associated SELCs 242, the SONET/SDH signals comprise OC-48/STM-16 signals, OC-192/STM-64 signals, OC-768/STM-256 signals, and like SONET/SDH signals as known in the art. Furthermore, in one embodiment, STS1/VC4 based switching (i.e., switching of the synchronous virtually-concatenated STS1-Yv/VC4-Xv signals) is performed using at least one timeslot interchanger (TSI).

In general, SSF comprises a switching fabric operable for performing synchronous switching. In one embodiment, SSF 250 comprises at least one TSI. In one embodiment, SSF 250 comprises at least one complementary metal-oxide semiconductor (CMOS) application specific integrated circuit (ASIC). In one embodiment, in which a HONE 112 comprises a SONET-based network element, SSF 250 may comprise an STS1-based IC. In another embodiment, in which a HONE 112 comprises a SDH-based network element, SSF 250 may comprise a VC4-based IC. In another embodiment, in which a HONE 112 comprises a hybrid SONET/SDH-based network element, SSF 250 may comprises an STS1-based IC and a VC4-based IC.

As depicted and described herein with respect to FIG. 2, HONE 112 comprises a SONET/SDH hybrid optical network element. In one embodiment, HONE 112 is implemented as one of a SONET HONE and a SDH HONE. As depicted in FIG. 2, HONE 112 comprises a logical representation of a hybrid optical network element. As such, although depicted as physically distinct line cards, in one embodiment the ingress-egress pairs of line cards are physically implemented on a single line card. For example, OILC $212_1$ and OELC $222_1$ are implemented as a single physical line card, OILC $212_2$ and OELC $222_2$ are implemented as a single physical line card, SILC $232_1$ and SELC $242_1$ are implemented as a single physical line card, and the like. A functional block diagram of an OTN line card is depicted and described herein with respect to FIG. 3.

Figure 3:
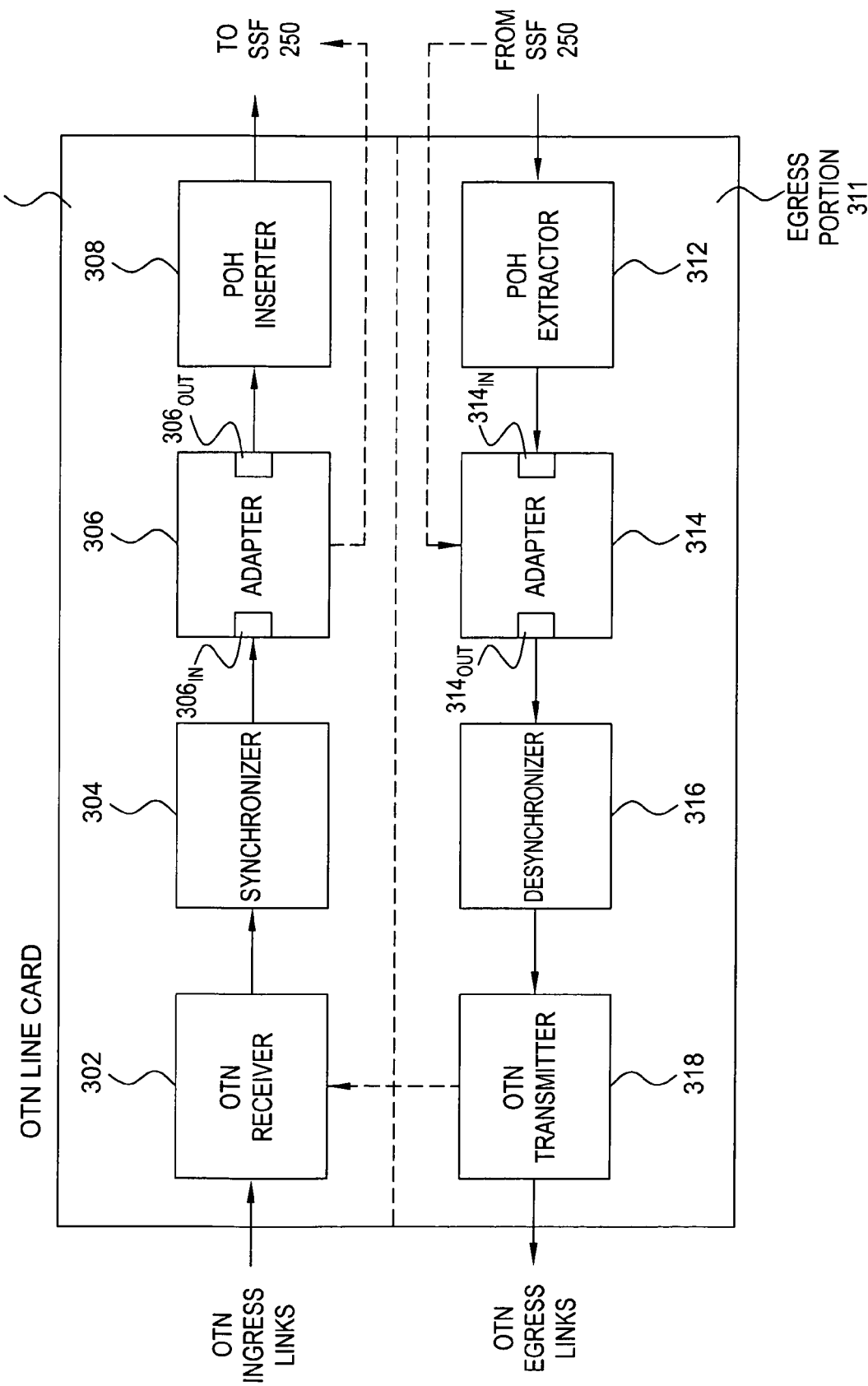
FIG. 3 depicts a high-level block diagram of an optical transport network line card.

FIG. 3 depicts a high-level block diagram of an optical transport network line card. Specifically, OTN line card 300 of FIG. 3 comprises an ingress portion (IP) 301 and an egress portion (EP) 311. As depicted in FIG. 3, ingress portion 301 comprises a functional representation of one of the OILCs 212 as depicted in FIG. 2. As such, the OTN ingress link as depicted in FIG. 3 comprises one of the OILs 214 as depicted in FIG. 2. Similarly, as depicted in FIG. 3, egress portion 311 comprises a functional representation of one of the OELCs 222 as depicted in FIG. 2. As such, OTN egress link depicted in FIG. 3 comprises one of the OELs 224 depicted in FIG. 2.

As depicted in FIG. 3, IP 301 comprises an OTN receiver 302, a synchronizer 304, an adapter 306, and a path overhead (POH) inserter 308. Similarly, EP 311 comprises a path overhead (POH) extractor 312, an adapter 314, a desynchronizer 316, and an OTN transmitter 318. Although depicted and described as comprising a distinct IP 301 and a distinct EP 311, those skilled in the art will appreciate that at least a portion of the functions of IP 301 and at least a portion of the functions of EP 311 may be implemented as a single physical module.

The OTN receiver 302 receives plesiochronous OTN signals (e.g., ODUk signals) via the OTN ingress link. The OTN receiver 302 processes the OTN signals (e.g., OTN receiver 302 extracts the ODUk signals from the OTN signals). In one embodiment, as described herein, the OTN signals comprise respective ODUk signals. In this embodiment, OTN receiver 302 transmits the plesiochronous ODUk signals to synchronizer 304. In general, the operation of OTN receivers is well known in the art.

The synchronizer 304 receives the ODUk signals from OTN receiver 302. The synchronizer 304 maps the plesiochronous ODUk signals into corresponding synchronous STS1-Yv/VC4-Xv signals. As described herein, in one embodiment, STS1-Yv comprises a virtual concatenation of Y sub-signals and VC4-Xv comprises a virtual concatenation of X sub-signals. In one embodiment, synchronizer 304 converts the timing of the received ODUk signal such that the received ODUk signal comprises signal timing according to a line clock and the STS1-Yv/VC4-Xv signal comprises signal timing according to a system clock. The synchronizer 304 transmits the resulting synchronous, virtually-concatenated STS1-Yv/VC4-Xv signals to adapter 306.

In one embodiment, synchronizer 304 converts plesiochronous ODUk signals into a synchronous STS1-Yv/VC4-Xv signals using asynchronous rate adaptation. In this embodiment, as a result of asynchronous rate adaptation performed by synchronizer 304, the bandwidth of each of the synchronous STS1-Yv/VC4-Xv signals output from synchronizer 304 is larger than the bandwidth of each of the associated ODUk signals input to synchronizer 304. As such, as a result of asynchronous rate adaptation performed by synchronizer 304, the STS1-Yv/VC4-Xv signals received by adapter 306 from synchronizer 304 comprise non-SONET/SDH data rate STS1-Yv/VC4-Xv signals.

The adapter 306 receives non-SONET/SDH data rate STS1-Yv/VC4-Xv signals from synchronizer 304 and adapts the non-SONET/SDH data rate STS1-Yv/VC4-Xv signals to produce respective SONET/SDH data rate STS1-Yv/VC4-Xv signals. In general, a non-SONET/SDH data rate signal comprises a signal having a data rate other than a standard SONET/SDH data rate, and a SONET/SDH data rate signal comprises a signal having a standard SONET/SDH data rate.

As depicted in FIG. 3, adapter 306 comprises a non-SONET/SDH data rate input interface $306_{IN}$ operable for receiving non-SONET/SDH data rate signals and a SONET/SDH data rate output interface $306_{OUT}$ operable for transmitting SONET/SDH data rate signals. In one embodiment, non-SONET/SDH data rate input interface $306_{IN}$ operates at a first clock speed (e.g., an ingress line speed) and SONET/SDH data rate output interface $306_{OUT}$ operates at a second clock speed (e.g., an egress line speed).

The signals output by adapter 306 comprise synchronous SONET/SDH data rate STS1-Yv/VC4-Xv signals. Furthermore, as described herein, the STS1-Yv/VC4-Xv signals comprise virtually-concatenated signals comprising respective pluralities of sub-signals (i.e., Y sub-signals for STS1-based signals and X sub-signals for VC4-based signals). In one embodiment, adapter 306 transmits the synchronous SONET/SDH data rate STS1-Yv/VC4-Xv signals to POH inserter 308. In another embodiment, adapter 306 optionally transmits the synchronous SONET/SDH data rate STS1-Yv/VC4-Xv signals to SSF 250.

The POH inserter 308 receives the synchronous SONET/SDH data rate STS1-Yv/VC4-Xv signals from adapter 306. The POH inserter 308 inserts overhead data for use by SSF 250 in switching the synchronous SONET/SDH data rate VC4-Xv signals. In one embodiment, for example, POH inserter 308 sets a portion of the path overhead bytes to fixed values. The POH inserter 308 transmits the synchronous SONET/SDH data rate STS1-Yv/VC4-Xv signals to SSF 250 for synchronous switching (i.e., STS1-based for SONET and VC4-based for SDH).

The SSF 250 receives the synchronous SONET/SDH data rate STS1-Yv/VC4-Xv signals from one of POH inserter 308 and, optionally, adapter 306. In one embodiment, synchronous switching of the synchronous SONET/SDH data rate STS1-Yv/VC4-Xv signals by SSF 250 comprises switching the virtually-concatenated sub-signals of which the STS1-Yv/VC4-Xv signal is composed. For example, for a SONET-based STS1 switching fabric, the 51 individual sub-signals virtually concatenated to form an associated STS1-51v synchronous signal are individually switched. Similarly, for example, for an SDH-based VC4 switching fabric, the 17 individual sub-signals virtually concatenated to form an associated VC4-17v synchronous signal are individually switched.

As such, SSF 250 performs synchronous switching of synchronous signals where the synchronous signals comprise virtually-concatenated signals comprising respective pluralities of sub-signals adapted for being synchronously switched. In one embodiment, mapping of plesiochronous signals to synchronous signals according to the present invention enables respective signal timings associated with the plesiochronous signals to be preserved. In another embodiment, mapping of plesiochronous signals to synchronous signals according to the present invention obviates the need for performing delay compensation at terminating nodes associated with the plesiochronous signals.

In one embodiment, in which SSF 250 receives the synchronous SONET/SDH data rate STS1-Yv/VC4-Xv signals from adapter 306 (i.e., POH was not inserted for synchronous switching), SSF 250 transmits the switched synchronous SONET/SDH data rate STS1-Yv/VC4-Xv signals directly to adapter 314. In another embodiment, in which SSF 250 receives synchronous SONET/SDH data rate STS1-Yv/VC4-Xv signals from POH inserter 308 (i.e., POH was inserted for synchronous switching), SSF 250 transmits switched synchronous SONET/SDH data rate STS1-Yv/VC4-Xv signals to the POH extractor 312.

The POH extractor 312 receives switched synchronous SONET/SDH data rate STS1-Yv/VC4-Xv signals from SSF 250. The POH extractor 312 extracts overhead data (i.e., path overhead data) inserted by POH inserter 308 prior to synchronous switching of the STS1-Yv/VC4-Xv signals by SSF 250. In one embodiment, path overhead extraction comprises resetting a portion of the path overhead bytes (originally set by POH inserter 308) to the previous values. The POH extractor 312 transmits the synchronous SONET/SDH data rate STS1-Yv/VC4-Xv signal to adapter 314.

The adapter 314 receives the synchronous SONET/SDH data rate STS1-Yv/VC4-Xv signals from POH extractor 312. The adapter 314 converts the synchronous SONET/SDH data rate STS1-Yv/VC4-Xv signals to respective synchronous non-SONET/SDH data rate STS1-Yv/VC4-Xv signals. In one embodiment, adapter 314 comprises a SONET/SDH data rate input interface $312_{IN}$ operating at a first clock speed (e.g., an ingress line speed) and a non-SONET/SDH data rate output interface $314_{OUT}$ operating at a second clock speed (e.g., an egress line speed). The signals output by adapter 314 comprise synchronous non-SONET/SDH data rate STS1-Yv/VC4-Xv signals. The adapter 314 transmits the synchronous non-SONET/SDH data rate STS1-Yv/VC4-Xv signals to the desynchronizer 316.

The desynchronizer 316 receives the non-SONET/SDH data rate STS1-Yv/VC4-Xv signals. The desynchronizer 316 converts the synchronous non-SONET/SDH data rate STS1-Yv/VC4-Xv signals to corresponding plesiochronous ODUk signals. In one embodiment, desynchronizer 316 converts the synchronous non-SONET/SDH data rate STS1-Yv/VC4-Xv signals into plesiochronous ODUk signals by reassembling the previously mapped non-SONET/SDH data rate STS1-Yv/VC4-Xv signals. In one embodiment desynchronizer 316 converts the synchronous non-SONET/SDH data rate STS1-Yv/VC4-Xv signals into plesiochronous ODUk signals using asynchronous rate adaptation processing. In one embodiment, reassembly is performed using connection routing information. In one such embodiment, the connection routing information comprises information such as configurations associated with paths traversed by signals routed through the SSF 250. The desynchronizer 316 transmits plesiochronous the ODUk signals to OTN transmitter 318.

The OTN transmitter 318 receives the ODUk signals from desynchronizer 316. In one embodiment, OTN transmitter 318 maps the plesiochronous ODUk signals into associated plesiochronous OTN signals. In one embodiment, OTN transmitter 318 converts the ODUk signals from electrical signals to respective optical signals. The OTN transmitter 318 transmits the plesiochronous OTN signals towards other optical network elements via the associated OTN egress link. In one embodiment, OTN transmitter 318 provides at least one of backward defect indication (BDI), backward error indication (BEI), and like error indications as known in the art to OTN receiver 302.

As such, as described herein with respect to mapping of plesiochronous signals to synchronous signals, in one embodiment, reassembly of synchronous signals to form plesiochronous signals according to the present invention enables respective signal timings associated with the plesiochronous signals to be preserved. In another embodiment, reassembly of synchronous signals to form plesiochronous signals according to the present invention obviates the need for performing delay compensation at terminating nodes associated with the plesiochronous signals. As such, the mapping, synchronous switching, and reassembly functions of the present invention function to preserve signal timings.

In general, as described herein, using the existing G.modem standard, STS1/VC4 signals are individually switched in the network elements as the respective STS1/VC4 signals traverse the network such that STS1/VC4 signals associated via virtual concatenation are transmitted using different egress line cards. In other words, individual STS1/VC4 signals may traverse different paths through the network, thereby requiring delay compensation on the terminating node on which the virtually-concatenated signals are reassembled.

For example, as depicted in FIG. 1, assume that HONE $112_1$ comprises an originating network element and that HONE $112_6$ comprises a terminating network element for an ODU1 signal in a SONET network. Using the existing G.modem standard, the 51 sub-signals generated at HONE $112_1$ may traverse different paths between HONEs HONE $112_1$ and $112_7$. For example, a portion of the sub-signals may traverse HONE $112_3$ and a portion of the sub-signals may traverse HONE $112_4$ requiring implementation of delay compensation on HONE $112_7$. Unfortunately, providing such delay compensation is quite complicated and, therefore, expensive.

As described herein, in one embodiment, virtually-concatenated signals are not virtually-concatenated signals in the narrower sense of the SONET/SDH standard. In other words, the virtually-concatenated signals do not include information (e.g., specific overhead bytes and like information) which must be evaluated for reassembly. Thus, in one embodiment, reassembly of the virtually-concatenated synchronous signals is performed using knowledge of connection routing. Similarly, in one embodiment, reassembly of the virtually-concatenated synchronous signals is performed using an assumption that delay compensation is not required.

As such, by ensuring that switching of plesiochronous signals is performed using mapped, virtually-concatenated synchronous signals that remain local to the network element (i.e., the mapped, virtually-concatenated synchronous signals are generated and terminated within a network element), the present invention thereby obviates a need to perform delay compensation processing on the network elements on which the respective plesiochronous signals are terminated. For example, in continuation of the above example, the implementation of the present invention in network 110 of FIG. 1 would obviate a need for delay compensation processing on terminating node HONE $112_7$.

As such, using the present invention, OTN signals are synchronously switched in a manner that is data transparent and timing transparent. In other words, the data stream is not impaired, and the associated signal timing may be used for network synchronization, network element synchronization, and like functions. For example, in one embodiment, in which the ODUk signals are transporting constant bit rate (CBR) signals (i.e., mapped OC-N/STM-N signals), the present invention preserves the entire CBR signal (including signal data and signal timing). As such, the preserved signal timing may be used as a source for synchronizing the transmission network.

As described herein, the present invention supports the synchronous switching of plesiochronous OTN signals using legacy SONET/SDH network elements. As such, the present invention enables service providers to upgrade existing network capacity, existing network services, and the like to utilize OTN transport capabilities without replacing the expensive network infrastructure already deployed in the service provider network. Furthermore, the present invention enables switching of higher-speed signals (e.g., ODUk, for k>3) not currently supported by existing standards (i.e., not currently supported by the ITU-T G.Modem standard).

It is contemplated that at least a portion of the described functions may be combined into fewer functional elements. Similarly, it is contemplated that various functions may be performed by other functional elements, or that the various functions may be distributed across the various functional elements in a different manner. For example, functions associated with the IP 301 may be distributed across OTN receiver 302, synchronizer 304, adapter 306, and POH inserter 308 in a different manner, and may be distributed across a portion of EP 311. Similarly, functions associated with the EP 311 may be distributed across POH extractor 312, adapter 314, desynchronizer 316, and OTN transmitter 318 in a different manner, and may be distributed across a portion of IP 301.

Although described herein primarily with respect to use of STS1-based switching (for SONET) and VC4-based switching (for SDH) for performing synchronous switching of plesiochronous signals, those skilled in the art will appreciate that various other signal types may be utilized for performing synchronous switching of plesiochronous signals in SONET/SDH networks. Similarly, other synchronous signals may be used for performing synchronous switching of plesiochronous signals. Furthermore, although primarily described herein with respect to hybrid optical networks comprising OTN networks and signals and SONET/SDH networks and signals, those skilled in the art will appreciate that the present invention may be used for synchronous switching of plesiochronous signals in various other networks and network topologies.

Figure 4:
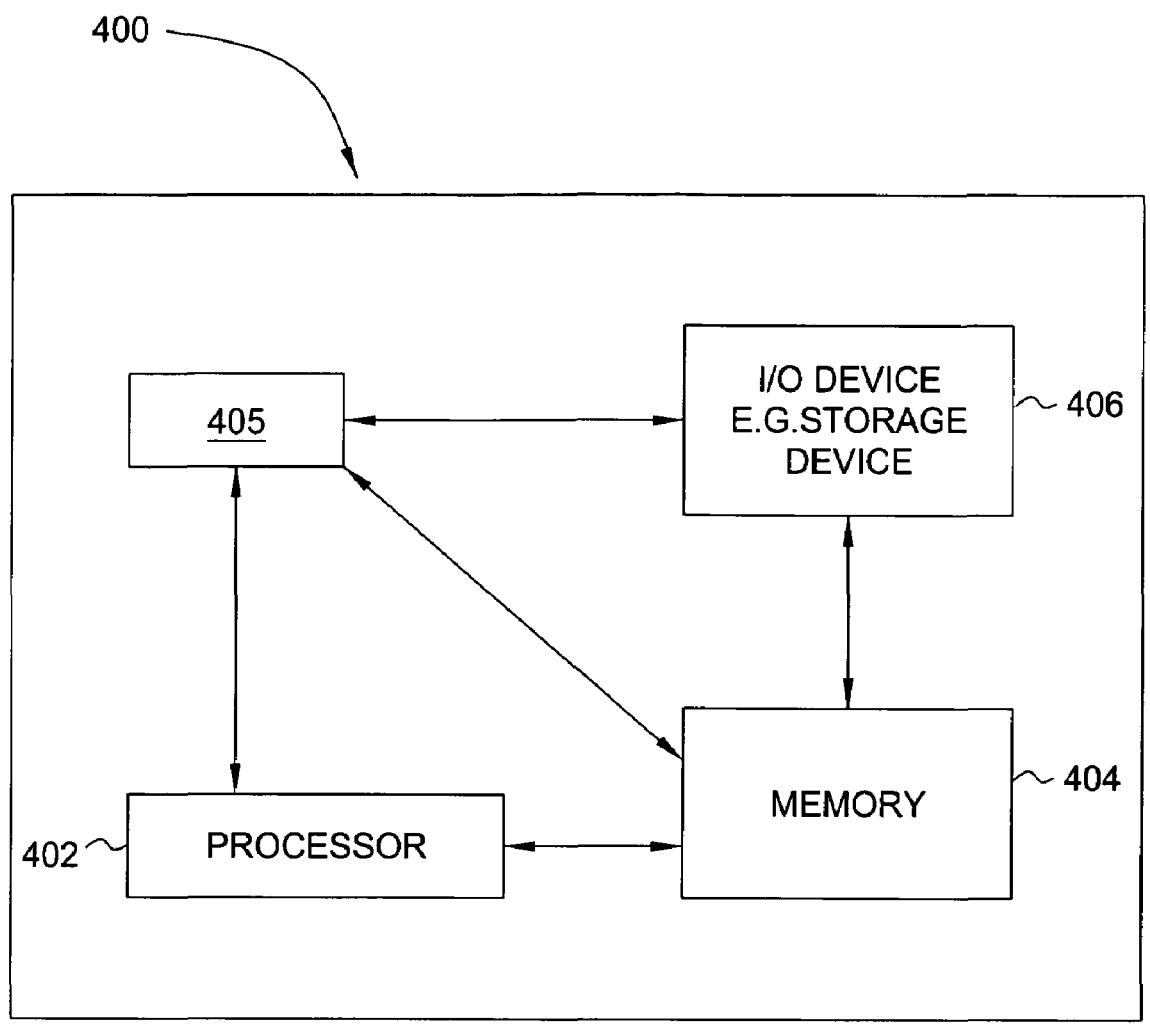
FIG. 4 depicts a high-level block diagram of a general purpose computer suitable for use in performing the functions described herein.

FIG. 4 depicts a high level block diagram of a general purpose computer suitable for use in performing the functions described herein. As depicted in FIG. 4, system 400 comprises a processor element 402 (e.g., a CPU), a memory 404, e.g., random access memory (RAM) and/or read only memory (ROM), a switching module 405, and various input/output devices 406 (e.g., storage devices, including but not limited to, a tape drive, a hard disk drive or a compact disk drive, a receiver, a transmitter, an output port, and a user input device).

It should be noted that the present invention may be implemented in software and/or in a combination of software and hardware, e.g., using application specific integrated circuits (ASIC), a general purpose computer or any other hardware equivalents. In one embodiment, the present switching module or process 405 can be loaded into memory 404 and executed by processor 402 to implement the functions as discussed above. As such, the switching process 405 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for synchronously switching a plesiochronous signal within a network element, comprising:
   receiving said plesiochronous signal;

mapping said plesiochronous signal into a synchronous signal comprising a plurality of virtually concatenated sub-signals, wherein said synchronous signal is a Synchronous Digital Hierarchy (SDH) Virtual Container (VC)-based signal comprising a plurality of virtually concatenated VC signals or a Synchronous Optical Network (SONET) Synchronous Transport Signal (STS)-based signal comprising a plurality of virtually concatenated STS signals;

inserting path overhead (POH) data into said synchronous signal; and switching said sub-signals of said synchronous signal within said network element using synchronous switching, wherein said synchronous switching is performed using VC-based switching if said synchronous signal is an SDH VC-based signal or using STS-based switching if said synchronous signal is a SONET STS-based signal, wherein said synchronous switching is performed using at least a portion of said POH data.

2. The method of claim 1, wherein said mapping said plesiochronous signal into said synchronous signal comprises:

converting said plesiochronous signal to said synchronous signal using asynchronous rate adaptation; and adapting a data rate of said synchronous signal from a non-standard data rate to a standard data rate using at least one clock signal.

3. The method of claim 1, wherein said mapping is performed in a manner tending to preserve at least one signal timing associated with said plesiochronous signal.

4. The method of claim 3, wherein said at least one signal timing is operable for use in performing at least one of network synchronization and network element synchronization.

5. The method of claim 1, wherein said mapping is performed in a manner tending to prevent a need for performing delay compensation processing on at least one terminating node associated with said plesiochronous signal.

6. The method of claim 1, further comprising:

reassembling said synchronous signal comprising said virtually concatenated sub-signals into said plesiochronous signal.

7. The method of claim 6, wherein said reassembling said synchronous signal comprising said virtually concatenated sub-signals into said plesiochronous signal comprises:

adapting said data rate of said synchronous signal from said standard data rate to said non-standard data rate using at least one clock signal; and converting said synchronous signal having said non-standard data rate to a plesiochronous signal using asynchronous rate adaptation.

8. The method of claim 6, wherein said reassembling is performed using connection routing information.

9. The method of claim 1, wherein said plesiochronous signal comprises an optical transport network (OTN) signal.

10. The method of claim 1, wherein:

if said synchronous signal is an SDH VC-based signal, said SDH VC-based signal is a VC-n-Xv signal having X number of VC signals; and if said synchronous signal is a SONET STS-based signal, said SONET STS-based signal is a STS-m-Yv signal having Y number of STS signals.

11. The method of claim 10, wherein:

if said plesiochronous signal is an ODU1 signal, X=17 for an SDH VC-based signal, and Y=51 for a SONET STS-based signal;

if said plesiochronous signal is an ODU2 signal, X=68 for an SDH VC-based signal, and Y=204 for a SONET STS-based signal; and if said plesiochronous signal is an ODU3 signal, X=272 for an SDH VC-based signal, and Y=816 for a SONET STS-based signal.

12. A method for synchronously switching a plesiochronous signal within a network element, comprising:

synchronously switching a plurality of virtually concatenated sub-signals of a synchronous signal within the network element, wherein said synchronous signal is a Synchronous Digital Hierarchy (SDH) Virtual Container (VC)-based signal comprising a plurality of virtually concatenated VC signals or a Synchronous Optical Network (SONET) Synchronous Transport Signal (STS)-based signal comprising a plurality of virtually concatenated STS signals, wherein said synchronous switching is performed using VC-based switching if said synchronous signal is an SDH VC-based signal or using STS-based switching if said synchronous signal is a SONET STS-based signal, wherein said synchronous switching is performed using path overhead (POH) data inserted into said synchronous signal prior to synchronous switching of said virtually concatenated sub-signals of said synchronous signal within the network element;

reassembling said plesiochronous signal using said virtually concatenated sub-signals of said synchronous signal; and propagating said plesiochronous signal toward another network element.

13. The method of claim 12, wherein said reassembling is performed in a manner tending to provide at least one of preserving at least one signal timing associated with said plesiochronous signal and preventing a need for performing delay compensation processing on at least one terminating node associated with said plesiochronous signal.

14. The method of claim 12, further comprising:
receiving said plesiochronous signal;
mapping said plesiochronous signal into said synchronous signal comprising said plurality of virtually concatenated sub-signals; and
inserting said POH data into said synchronous signal.

15. The method of claim 14, wherein:
said mapping comprises:
converting said plesiochronous signal to said synchronous signal using asynchronous rate adaptation; and
adapting a data rate of said synchronous signal from a non-standard data rate to a standard data rate using at least one clock signal; and
said reassembling comprises:
adapting said data rate of said synchronous signal from said standard data rate to said non-standard data rate using at least one clock signal; and
converting said synchronous signal having said non-standard data rate to said plesiochronous signal using asynchronous rate adaptation processing.

16. An apparatus for synchronously switching a plesiochronous signal within a network element, comprising:
means for receiving said plesiochronous signal;
means for mapping said plesiochronous signal into a synchronous signal comprising a plurality of virtually concatenated sub-signals, wherein said synchronous signal is a Synchronous Digital Hierarchy (SDH) Virtual Container (VC)-based signal comprising a plurality of virtually concatenated VC signals or a Synchronous Optical Network (SONET) Synchronous Transport Signal (STS)-based signal comprising a plurality of virtually concatenated STS signals;

means for inserting path overhead (POH) data into said synchronous signal; and means for switching said sub-signals of said synchronous signal within said network element using synchronous switching, wherein said synchronous switching is performed using VC-based switching if said synchronous signal is an SDH VC-based signal or using STS-based switching if said synchronous signal is a SONET STS-based signal, wherein said synchronous switching is performed using at least a portion of said POH data.

17. The apparatus of claim 16, wherein said means for mapping is operable for mapping in a manner tending to enable at least one of preserving at least one signal timing associated with said plesiochronous signal and preventing a need for performing delay compensation processing on at least one terminating node associated with said plesiochronous signal.

18. The apparatus of claim 16, further comprising:

means for reassembling said plesiochronous signal using said virtually concatenated sub-signals of said synchronous signal.

19. A method for synchronously switching a plesiochronous signal within a network element, comprising:

receiving said plesiochronous signal;

mapping said plesiochronous signal into a synchronous signal using asynchronous rate adaptation, said synchronous signal comprising a plurality of virtually concatenated sub-signals, wherein said virtually-concatenated sub-signals are Synchronous Digital Hierarchy (SDH) Virtual Container (VC) signals or Synchronous Optical Network (SONET) Synchronous Transport Signal (STS) signals;

inserting path overhead (POH) data into said synchronous signal; and switching said sub-signals of said synchronous signal within said network element using synchronous switching, wherein said synchronous switching is performed using at least a portion of said POH data.

* * * * *